March 8, 1938. P. N. MARTIN 2,110,304
RAILWAY TRACK CIRCUIT APPARATUS
Filed Oct. 27, 1936

INVENTOR
Paul N. Martin.
BY
HIS ATTORNEY

Patented Mar. 8, 1938

2,110,304

UNITED STATES PATENT OFFICE 2,110,304

RAILWAY TRACK CIRCUIT APPARATUS

Paul N. Martin, Swissvale, Pa., assignor to The Union Switch & Signal Company, Swissvale, Pa., a corporation of Pennsylvania Application October 27, 1936, Serial No. 107,846

20 Claims. (Cl. 246—41)

My invention relates to railway track circuit apparatus and has for an object the provision of novel and useful apparatus for improving the shunting sensitivity of a track circuit and for expediting the release of the track relay when a vehicle enters the track section with which the track relay is associated. Other features and advantages of my invention will appear as the description progresses.

I will describe several forms of apparatus embodying my invention, and will then point out the novel features thereof in claims.

The present application is a division in part and a continuation in part of my copending application Serial No. 699,381, filed November 23, 1933, for Railway track circuit apparatus, now Patent No. 2,062,521, granted December 1, 1936.

Figure 1:
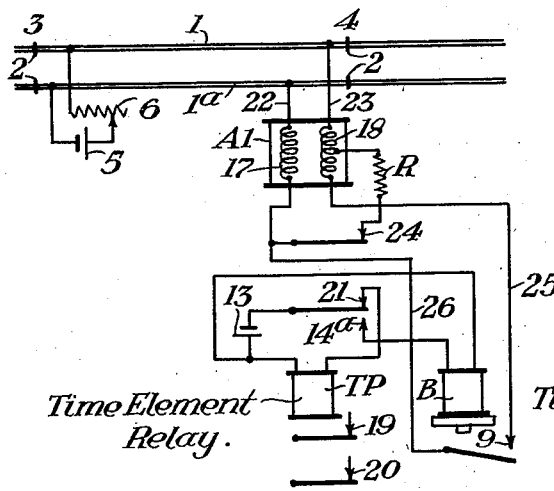
Figure 2:
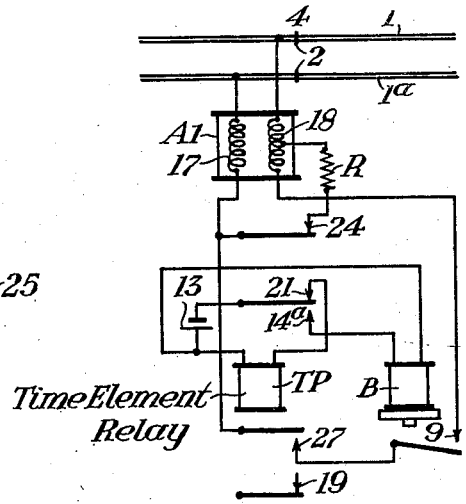
Figure 3:
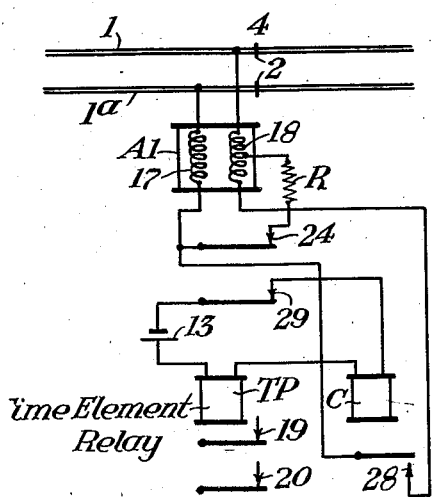
Figure 4:
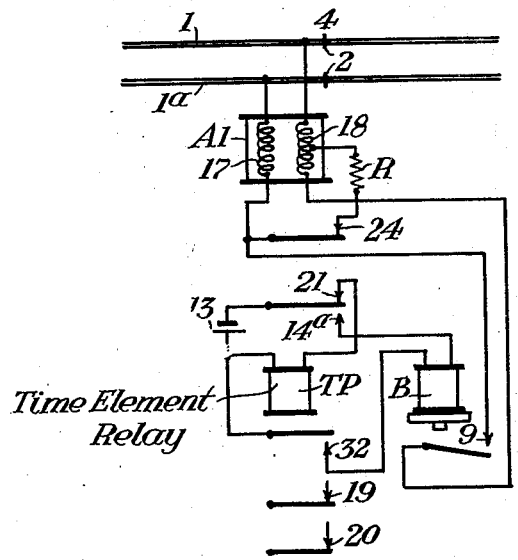

In the accompanying drawing, Fig. 1 is a diagrammatic view showing one form of track circuit apparatus embodying my invention. Figs. 2, 3, and 4 are diagrammatic views showing modified forms of the apparatus of Fig. 1, and also embodying my invention.

Similar reference characters refer to similar parts in each of the several views.

In the ordinary track circuit, since the normal energy level effective at the track relay is considerably above the pickup value of the relay, the train shunt must be sufficiently effective to by-pass the increment of current above the release value of the relay. Not only does this require a relatively low resistance train shunt but also a shunt which is effective for an appreciable time interval because the relay flux requires an appreciable time to die down from the normal energy level to the release level. Apparatus embodying my invention makes it possible to reduce the normal energy level for the track relay below the pickup value both by decreasing the effective turns and by inserting resistance in series with the operating winding of the relay after it picks up, thus enabling a higher resistance train shunt to release the relay. The decrease in the number of turns and the addition of resistance in series with the winding of the track relay not only aid to decrease the energy level but also cause a more rapid flux decay on account of a decrease in the inductance to resistance ratio, thus decreasing the release time of the track relay.

The primary-secondary relay combinations heretofore proposed and consisting of a track relay and a slow pickup repeater relay are effective for improving shunting sensitivity, but these combinations may not be effective for avoiding false signal operation in the event of a momentary loss of train shunt or an intermittent high resistance train shunt. This is so because, if the primary relay once picks up after a train shunt has caused it to release, it will remain energized over its pickup circuit until the secondary relay picks up also and transfers the primary relay to its holding circuit. Thus, there is some danger of a momentary clear signal indication being given with the block occupied. Apparatus embodying my invention diminishes this possibility in that, should the train shunt resistance become high enough to allow the track relay to pick up, this relay will at once be transferred to its holding circuit. As a result, its energization will be immediately reduced so that it will be more likely to release again before the secondary relay has had an opportunity to pick up and to close the clear signal circuits.

Referring to Fig. 1, the reference characters 1 and 1ª designate the rails of a stretch of railway track which are divided by insulated rail joints 2 to form a track section 3—4. The section 3—4 is provided with a track circuit which comprises as its essential elements the traffic rails bonded in the customary manner, a source of current 5 connected across the rails at one end of the section through an adjustable resistor 6, and a track relay AI receiving energy from the rails at the other end of the section. For convenience, the operating winding of the track relay AI is illustrated in the form of two coils 17 and 18 corresponding to the two coils of the usual track relay. As viewed in the drawing, the upper terminal of coil 17 is connected with the rail 1ª over a wire 22, and the upper terminal of the coil 18 is connected with the rail 1 over a wire 23, the two lower terminals of the coils 17 and 18 being, at times, connected together over the wires 26 and 25 and the front contact 9 of an auxiliary slow releasing relay B. A resistor R is connected between the lower terminal of the coil 17 and an intermediate terminal of the coil 18, over a front contact 24 of the relay AI. It follows that the pickup circuit for relay AI includes the entire operating winding of the relay and excludes resistor R, whereas the holding circuit includes only a portion of the operating winding and includes the resistor R. This resistor is preferably so proportioned as to compensate for the reduced resistance of the relay winding, although it is not essential that resistor R have this particular value.

The auxiliary relay B is supplied with current from a separate battery 13 over the back contact 14ª of the track relay AI. Consequently, relay B is normally deenergized so that the pickup circuit for relay AI is normally open at front contact 9.

The reference character TP designates a time element relay which is energized from battery 13 over a front contact 21 of relay AI. Relay TP requires a predetermined time interval for closing its front contacts 19 and 20, which may be used for controlling the wayside signals or other suitable traffic governing apparatus. It will be apparent, therefore, that a momentary pickup of the primary relay AI cannot cause an improper signal to be given because of the time interval which is required for contacts 19 and 20 of the secondary relay TP to become closed.

I shall now explain the manner in which the system of Fig. 1 operates. With the section unoccupied, the apparatus assumes the condition illustrated in the drawing, in which the auxiliary relay B is deenergized and both the primary relay AI and the secondary relay TP are energized. It should be pointed out that the intermediate terminal for the coil 18 of relay AI is so located with respect to the number of turns which are excluded from the holding circuit, and the value of resistor R is so chosen, that the normal energization of the primary relay AI is relatively low, being only sufficiently high above the release value to assure reliable operation under various ballast conditions. This low energy level for the relay AI makes it possible to obtain a relatively high shunting sensitivity and a quick release when a vehicle enters the section.

When a train enters the section, the primary relay AI will release, opening the circuit for the secondary relay TP, which will release, in turn, and will open its traffic controlling contacts 19 and 20. The release of relay AI will also close the energizing circuit for the auxiliary relay B so that this relay will pick up and will close the pickup circuit for relay AI in readiness for the exit of the train from the section.

When the train leaves the section, the track voltage will be applied across the full operating winding of relay AI, over the pickup circuit, so that a relatively high energy level will be supplied to this relay during its pickup period. The pickup of relay AI opens the circuit for the auxiliary relay B and closes the circuit for the secondary relay TP. The auxiliary relay will operate at the end of its slow release period to open the pickup circuit for relay AI so that the latter relay will now remain energized over its holding circuit. The secondary relay TP will also operate at the end of its slow pickup period to close the traffic controlling contacts 19 and 20, whereupon the apparatus will be restored to the condition in which it is illustrated. The slow release period for the auxiliary relay B should preferably be less than the slow pickup period of the secondary relay TP so that the primary relay AI will be transferred to its holding circuit prior to the closing of the traffic governing contacts 19 and 20.

If the resistance of the train shunt varies intermittently as the vehicle passes through the section, the primary relay AI may pick up and release, following the variations of the train shunt resistance, but the secondary relay TP will not pick up and so will not close the traffic governing front contacts 19 and 20. In the case of the usual primary-secondary relay combination, the secondary relay must first pick up, before the primary relay is transferred from its pickup circuit to its holding circuit. Consequently, after a train has entered the section and caused the relays to release, if the train shunt should momentarily become high enough to allow the primary relay to pick up, the primary relay would be likely to remain picked up until the secondary relay also picked up and reduced the energization by transferring the primary relay to its holding circuit. The result of such a condition is that there may occur a momentary interval during which the traffic governing front contacts of the secondary relay are closed, so that a false clear "flip" of the traffic governing devices may occur.

With the apparatus of Fig. 1, however, after a train has entered the section and caused the relays AI and TP to release, if a high resistance train shunt occurs so that the primary relay AI picks up, the auxiliary relay B functions immediately to transfer the relay AI to its holding circuit and so reduces its energization. This reduced energization will, under ordinary variations of train shunt, be sufficient to release the primary relay and hence stop the energization of the time element secondary relay TP before the latter has picked up and has closed its traffic governing contacts. Should the intermittent train shunt persist for a prolonged time interval, there would result only a "pumping" action of the relays AI and B without operation of the traffic governing contacts of the secondary relay TP. Consequently, the auxiliary relay B, when applied to the primary-secondary combination of relays AI and TP, is effective to avoid false operation of traffic governing devices due to an intermittent train shunt of high resistance.

It should be pointed out that, if desired, the front contact 24 of relay AI may be replaced by a permanent electrical connection. In such a case, the holding circuit for relay AI will, at all times, remain effective and will not embody the "stick" feature which is present in the circuit as illustrated. One advantage resulting from the use of front contact 24 is that once this contact opens, the apparatus must go through a complete cycle of operation before the track relay can receive any energy whatever. With contact 24 replaced by a solid connection, an intermittent train shunt of high resistance might not always be effective to release the track relay.

If desired, relay B may have a retarded pickup, in addition to its retarded release, so as to delay the restoration of the pickup circuit for relay AI after this relay has been shunted.

Referring now to Fig. 2, I have shown in this figure a modification of Fig. 1 in which a back contact 27 of the secondary relay TP is included in the pickup circuit for the primary relay AI, along with front contact 9 of relay B. The use of back contact 27 in this manner provides protection against an accidental failure of relay B to release properly. In the apparatus of Fig. 1, such a failure might remain undetected. In Fig. 2, however, should relay B fail to release, the pickup circuit for relay AI will become opened, following the exit of a train from the section, as soon as relay TP opens its back contact 27. Due to the safety feature provided by contact 27, relay B of Fig. 2 may be a relatively inexpensive relay which need not necessarily meet all of the rigid safety requirements of standard signaling apparatus.

Referring to Fig. 3, the apparatus of this figure is the same as that of Fig. 1, with the exception that the normally deenergized slow release relay B is replaced by a normally energized relay C having no special retardation in its operation. Since both relays C and TP are normally energized, these relays may be controlled over the single front contact 29 of relay AI and may be connected either in series, as shown in the drawing, or in parallel, if preferred.

When a train enters the section, relay AI will release, opening its holding circuit at front contact 24 and also opening the circuit for relays TP and C at front contact 29. In releasing, relay TP opens the signal circuits at contacts 19 and 20, and relay C closes the pickup circuit for relay A1 at back contact 28. As soon as the train leaves the section, relay A1 will pick up, thus reclosing its holding circuit and re-energizing relays TP and C. Thereupon, relay C will pick up immediately and will open the pickup circuit for relay A1, whereas relay TP will go through its time element pickup cycle, after which it will restore the signal circuits. The apparatus will then be in the condition in which it is illustrated.

Referring to Fig. 4, the apparatus of this figure is similar to that shown in Fig. 1 with the exception that the control of relay B is carried not only over a back contact 14ª of relay A1, as in Fig. 1, but also over a back contact 32 of relay TP. Since the release time of relay TP is added to the pickup time of relay B before the pickup circuit for relay A1 can become effective, the apparatus of Fig. 4 provides a longer delay in the pickup of relay A1 to guard against a temporary loss of shunt following the release of relay A1.

Although direct current track circuits and direct current relays have been illustrated for the sake of simplicity, it will be understood that my invention is not limited to direct current apparatus but can be applied to track circuits employing alternating current or any other suitable form of electrical energy.

Although I have herein shown and described only a few forms of apparatus embodying my invention, it is to be understood that various changes and modifications may be made therein within the scope of the appended claims without departing from the spirit and scope of my invention.

Having thus described my invention, what I claim is:

1. In combination, a first relay and a repeater relay, said repeater relay preferably having a slow pickup period, a control contact operated by said repeater relay, means for energizing the repeater relay when the armature of the first relay is picked up, a circuit including the operating winding of the first relay, and means operating when the armature of the first relay is picked up to decrease the ampere turns of the operating winding of said first relay, said means being arranged to operate in less than said pickup time of said repeater relay, whereby the current value at which the armature of the first relay will release is increased prior to the operation of said control contact.

2. In combination, a first, a second, and a third relay, said second relay being characterized by having a slow pickup period and said third relay being characterized by having a slow release period which is less than said slow pickup period; means for energizing said second relay when the armature of said first relay is picked up, means for energizing said third relay when the armature of said first relay is released, a circuit for energizing said first relay including the operating winding thereof, and means operating when the armature of said third relay is released to increase the voltage value at which the armature of said first relay will release.

3. In combination with a section of railway track and a source of current connected across the rails of said section, a primary relay, a secondary relay preferably characterized by having a slow pickup period, an auxiliary relay characterized by having a slow release period which is less than the slow pickup period of the secondary relay, a holding circuit for the primary relay connected across the rails of the section and including a resistor in series with the winding of the relay to decrease the magnetomotive force established by said winding, a pickup circuit for the primary relay connected across the rails of the section and including a front contact of the auxiliary relay, means for energizing the secondary relay including a front contact of the primary relay, a traffic governing contact operated by the secondary relay, and means for energizing the auxiliary relay including a back contact of the primary relay whereby magnetomotive force of increased value is provided for picking up the primary relay and is then reduced prior to the operation of the traffic governing contact by the secondary relay.

4. In combination with a section of railway track and a source of current connected across the rails of the section, a track relay and a repeater relay, said repeater relay preferably characterized by having a slow pickup period, a first circuit for the track relay connected across the rails of the section and including only a portion of its operating winding, a second circuit for the track relay connected across the traffic rails and including a circuit controlling contact as well as its entire operating winding, said contact being normally open, means for energizing the repeater relay including a front contact of the track relay, a traffic controlling contact operated by the repeater relay, and electroresponsive means controlled by a back contact of the track relay effective to close said circuit controlling contact, said electroresponsive means characterized by having a delayed action in releasing said circuit controlling contact which is less than said given pickup period of the repeater relay, whereby energization of relatively high level is effective to pick up the track relay and is reduced to a lower level prior to the time the repeater relay picks up and thereby operates the traffic controlling contact.

5. In combination, a primary relay, a slow pickup secondary relay, a slow release auxiliary relay, an operating circuit for said secondary relay including a front contact of said primary relay, an operating circuit for said auxiliary relay including a back contact of said primary relay, a holding circuit for said primary relay, a pickup circuit for said primary relay including a front contact of said auxiliary relay, and a signal control contact governed by said secondary relay.

6. In combination, a primary relay, a slow pickup secondary relay, a slow release auxiliary relay, an operating circuit for said secondary relay including a front contact of said primary relay, an operating circuit for said auxiliary relay including a back contact of said primary relay, a pickup circuit for said primary relay including a front contact of said auxiliary relay, a holding circuit for said primary relay including a front contact thereof, and a signal control contact governed by said secondary relay.

7. In combination, a primary relay, a secondary relay, an auxiliary relay, means governed by said primary relay for energizing said secondary relay and said auxiliary relay, means governed by said auxiliary relay for closing a pickup circuit for said primary relay, a holding circuit for said primary relay including a front contact thereof, and a signal control contact governed by said secondary relay.

8. In combination, a primary relay, a slow acting secondary relay, an auxiliary relay, means governed by said primary relay for energizing said secondary relay and said auxiliary relay, means governed by said auxiliary relay for closing a pickup circuit for said primary relay, a holding circuit for said primary relay, and a signal control contact governed by said secondary relay.

9. In combination, a primary relay, a slow acting secondary relay, an auxiliary relay, means governed by said primary relay for energizing said secondary relay and said auxiliary relay, an operating circuit for said primary relay effective for maintaining said primary relay picked up, means controlled by said auxiliary relay and effective for increasing the voltage value at which said primary relay will release, and a signal control contact governed by said secondary relay.

10. In combination, a primary relay, a slow acting secondary relay, an auxiliary relay, means governed by said primary relay for energizing said secondary relay and said auxiliary relay, a pickup circuit for said primary relay controlled by said auxiliary relay and including the full winding of the primary relay, a holding circuit for said primary relay including less than the full winding of the primary relay, and a signal control contact governed by said secondary relay.

11. In combination, a primary relay, a secondary relay, an auxiliary relay, an energizing circuit for said secondary relay including a front contact of said primary relay, an energizing circuit for said auxiliary relay including a back contact of said primary relay, a holding circuit for said primary relay including a front contact thereof, and a pickup circuit for said primary relay including a front contact of said auxiliary relay and a back contact of said secondary relay.

12. In combination, a primary relay, a secondary relay, an auxiliary relay, an energizing circuit for said secondary relay effective when said primary relay is picked up, an energizing circuit for said auxiliary relay effective when said primary relay is released, a pickup circuit for said primary relay for establishing a given energy level in the primary relay and effective when and only when said auxiliary relay is energized and said secondary relay is released, and a holding circuit for said primary relay for establishing in the primary relay an energy level below said given energy level established by said pickup circuit.

13. In combination, a primary relay, a secondary relay, an auxiliary relay, an energizing circuit for said secondary relay including a front contact of said primary relay, an energizing circuit for said auxiliary relay including a back contact of said primary relay as well as a back contact of said secondary relay, a holding circuit for said primary relay, and a pickup circuit for said primary relay including a front contact of said auxiliary relay.

14. In combination, a primary relay, a secondary relay, an auxiliary relay, an energizing circuit for said secondary relay effective when said primary relay is picked up, an energizing circuit for said auxiliary relay effective when said primary relay and said secondary relay are both released, a pickup circuit for said primary relay for establishing a given energy level in the primary relay and effective when said auxiliary relay is energized, and a holding circuit for said primary relay for establishing in the primary relay an energy level below said given energy level established by said pickup circuit.

15. In combination, a primary relay, a slow pickup secondary relay, an auxiliary relay, means effective when said primary relay is picked up for picking up both said secondary relay and said auxiliary relay, a holding circuit for said primary relay, a pickup circuit for said primary relay including a back contact of said auxiliary relay, and a signal control contact governed by said secondary relay.

16. In combination, a primary relay, a slow acting secondary relay, an auxiliary relay, means controlled by said primary relay for energizing both said secondary relay and said auxiliary relay, a pickup circuit for said primary relay controlled by said auxiliary relay for establishing a given energy level in the primary relay, a holding circuit for said primary relay for establishing in the primary relay an energy level below said given energy level established by said pickup circuit, and a signal control contact governed by said secondary relay.

17. In combination, a primary relay, a slow pickup secondary relay, an auxiliary relay, a circuit including a front contact of said primary relay for picking up both said secondary relay and said auxiliary relay, a holding circuit for said primary relay, a pickup circuit for said primary relay including a back contact of said auxiliary relay, and a signal control contact governed by said secondary relay.

18. In combination with a section of railway track and a source of current connected across the rails of said section, a primary relay, a slow acting secondary relay, an auxiliary relay, means governed by said primary relay for energizing both said secondary and said auxiliary relay, a pickup circuit for said primary relay connected across the rails of said section and energized when said auxiliary relay is deenergized as well as including the full winding of said primary relay, a holding circuit for said primary relay connected across the rails of said section and including less than the full winding of said primary relay, and a signal control contact governed by said secondary relay.

19. In combination with a section of railway track and a source of current connected across the rails of said section, a primary relay, a slow pickup secondary relay, an auxiliary relay, an energizing circuit for said secondary relay including a front contact of said primary relay, an energizing circuit for said auxiliary relay including a back contact of said primary relay, a holding circuit for said primary relay connected across the rails of said section, a pickup circuit for said primary relay connected across the rails of said section and including a front contact of said auxiliary relay, and a signal control contact governed by said secondary relay.

20. In combination with a section of railway track and a source of current connected across the rails of said section, a primary relay, a secondary relay, an auxiliary relay, means effective when said primary relay is picked up for energizing said secondary relay, means effective when said primary relay is released for energizing said auxiliary relay, a holding circuit for said primary relay connected across the rails of said section, a pickup circuit for said primary relay connected across the rails of said section and controlled by both said secondary relay and said auxiliary relay, and a signal control contact governed by said secondary relay.

PAUL N. MARTIN.